(12) United States Patent
Yamada et al.

(10) Patent No.: US 6,560,530 B1
(45) Date of Patent: May 6, 2003

(54) NAVIGATION SYSTEM

(75) Inventors: Kunihiro Yamada, Okazaki (JP);
Kazuteru Maekawa, Okazaki (JP);
Hiroyoshi Masuda, Okazaki (JP);
Yumi Shibata, Okazaki (JP); Kihachi Hayashida, Okazaki (JP); Minoru Ootake, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 128 days.

(21) Appl. No.: 09/692,143

(22) Filed: Oct. 20, 2000

(30) Foreign Application Priority Data

Oct. 20, 1999 (JP) ............................ 11-298023
Oct. 22, 1999 (JP) ............................ 11-300766

(51) Int. Cl.$^7$ ............................................ G06C 21/00
(52) U.S. Cl. ........................ 701/208; 701/209; 701/211; 340/988; 340/995; 342/357.13
(58) Field of Search ................................ 701/200, 208, 701/209, 211, 25; 340/988, 995; 342/357.13

(56) References Cited

U.S. PATENT DOCUMENTS 5,537,324 A * 7/1996 Nimura et al. .............. 364/449
5,838,330 A * 11/1998 Ajima ........................ 345/427
6,202,026 B1 * 3/2001 Nimura et al. .............. 701/211

* cited by examiner

Primary Examiner—Yonel Beaulieu
(74) Attorney, Agent, or Firm—Oliff & Berridge, PLC

(57) ABSTRACT

A navigation system for searching coordinates of a telephone number, displaying a map and setting a point, the navigation system comprising a memory for storing information on a subscriber inclusive of coordinates corresponding to a telephone number and map data, an input device for inputting a telephone number, and a control device for searching a subscriber and coordinates based on the input of the telephone number, setting specific coordinates based on the searched coordinates and displaying a map with the specific coordinates located at the center of the map on a condition that the searched subscriber is a specific classified subscriber, wherein a map with a vague point located at the center of the map is displayed while a private home is not directly displayed thereon when the subscriber is a private subscriber of the input telephone number.

22 Claims, 10 Drawing Sheets

TELEPHONE NUMBER DATA

| 1 | TELEPHONE NUMBER |
|---|---|
|   | POINT INFORMATION OFFSET |
| 2 | TELEPHONE NUMBER |
|   | POINT INFORMATION OFFSET |
|   | ⋮ |

JAPANESE SYLLABARY DATA

| 1 | READING |
|---|---|
|   | POINT NAME |
|   | POINT INFORMATION OFFSET |
| 2 | READING |
|   | POINT NAME |
|   | POINT INFORMATION OFFSET |
|   | ⋮ |

TELEPHONE NUMBER DATA

| 1 | TELEPHONE NUMBER |
|---|---|
|   | READING |
|   | POINT NAME |
|   | ADDRESS |
|   | POINT COORDINATES (x1,y1) |
|   | IDENTIFICATION FLAG |
| 2 | TELEPHONE NUMBER |
|   | READING |
|   | POINT NAME |
|   | ADDRESS |
|   | POINT COORDINATES (x2,y2) |
|   | IDENTIFICATION FLAG |
| 3 | TELEPHONE NUMBER |
|   | READING |
|   | POINT NAME |
|   | ADDRESS |
|   | POINT COORDINATES (x3,y3) |
|   | IDENTIFICATION FLAG |
|   | ⋮ |

(ADDRESS)

| PERFECTURAL CODE |
|---|
| MUNICIPAL DISTRICT (city, ward, town, village) CODES |
| COAZA (a large section of village) CODE |
| KOAZA (a small section of village) CODE |
| THE FOLLOWING CODES |

FIG. 3

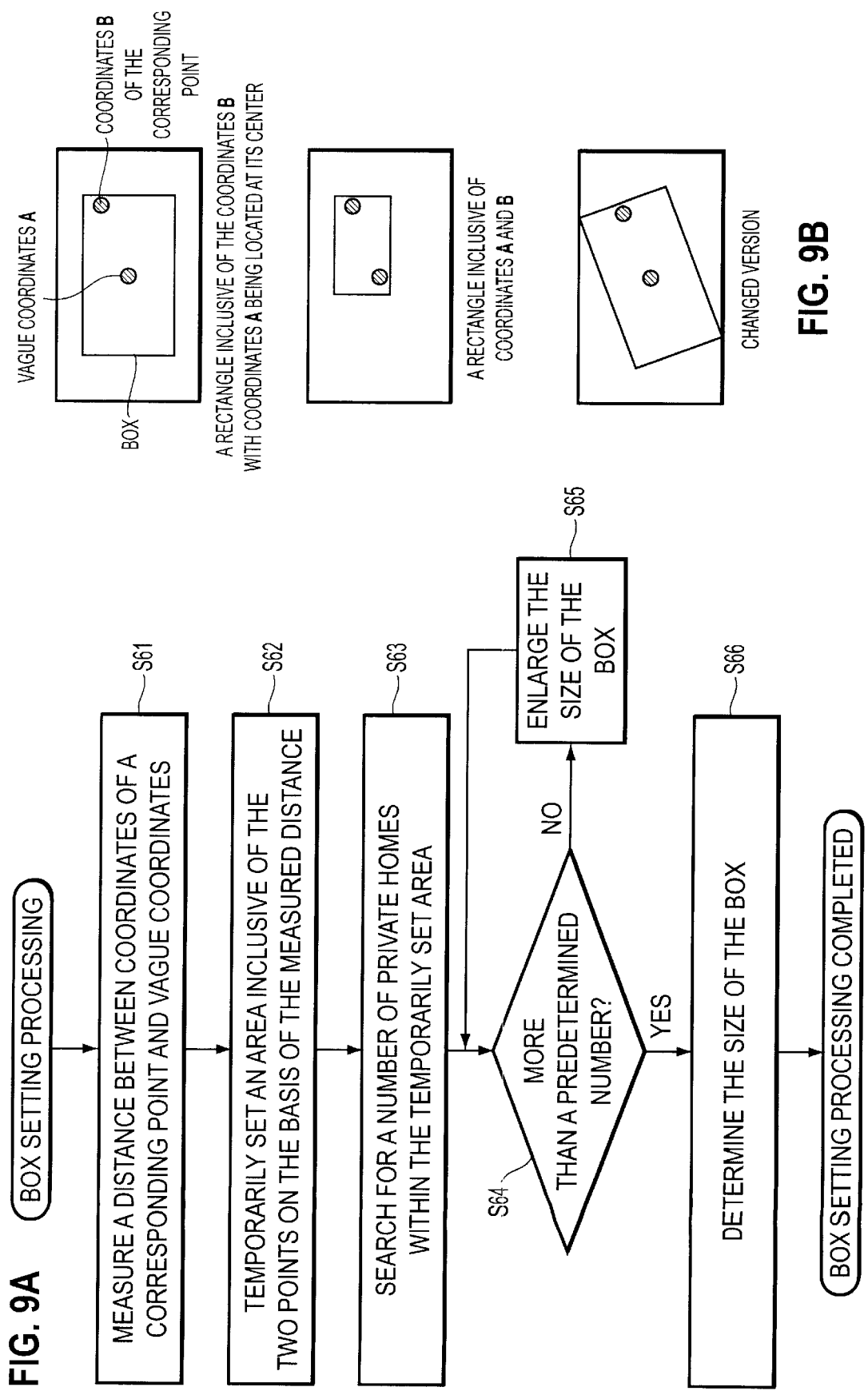

NAVIGATION SYSTEM

BACKGROUND OF THE INVENTION

1. Field of Invention

The invention relates to a navigation system. The navigation system searches for coordinates based on an input of a telephone number, displays a map and executes a point setting i.e., a located.

2. Description of Related Art

A vehicle navigation system for searching a point corresponding to an input telephone number and displaying a map with the searched point located at its center has been used. The system displays a map, with a point of an entrepreneur located at its center, corresponding to a telephone number. However, if the telephone number belongs to a private home, displaying the located of the private number may be discouraged based on the privacy of the subscriber. In order to allow the subscriber some privacy, a map with a representative point located in a general area to which a corresponding private home belongs (ex. Koaza level—a small area of village), with the point located at the center of the map is displayed, or facilities (a police station, a department store etc.) located in an area generally surrounding the corresponding private home is stored with the facilities matched with a group of private homes so that a map with the facility matching a telephone number is displayed.

However, when a wrong telephone number is input, a map is displayed with the same representative point located at its center as long as the telephone number belongs to the same Koaza (a small area of village). Thus, it is difficult for the user to search a private home while only using a map with a representative point of an area located at its center since the extent of the area can be large depending on the area selected. Further, if a proximate number of facilities is used as data points corresponding to a respective number of private homes, the proximate facilities (data) given to all of the private homes can consist of tens of millions of private homes as guide points, thus increasing the amount of data required.

SUMMARY OF THE INVENTION

The invention displays a map with a general point located at its center corresponding to an input of a telephone number of a private home without precisely displaying the located of the private home.

The invention separately determines the located of a desired private home within a limited box even if a map with a point corresponding to an input of a telephone number of a private home is not displayed.

In various exemplary embodiments of a navigation system for searching coordinates based on an input of a telephone number, displaying a map and setting a point, the navigation system includes a memory means for storing information on a subscriber inclusive of coordinates corresponding to a telephone number, input means for inputting a telephone number, search means for searching for a subscriber and coordinates based on the input of the telephone number, coordinates setting means for setting specific coordinates based on the searched coordinates and control means for displaying a map with the specific coordinates searched by the coordinates setting means located at its center on a condition that a subscriber searched by the search means is a specific classified subscriber.

Further, the specific coordinates are coordinates in which respective arbitrary digit numbers of the searched coordinates are changed to zero or the numbers are rounded to the nearest whole number. The specific coordinates are also coordinates in which the searched coordinates values are changed, coordinates of an intersection closest to the searched coordinates, or coordinates of a specific facility closest to the searched coordinates.

In another exemplary embodiment of a navigation system for searching coordinates based on an input of a telephone number, displaying a map based on the coordinates and setting a point, the navigation system includes a memory means for storing information on a subscriber inclusive of coordinates corresponding to a telephone number and map data, input means for inputting a telephone number, a search means for searching for coordinates stored in the stored memory means based on the input of the telephone number from the input means, area setting means for setting a predetermined area inclusive of the coordinates searched by the search means, and control means for displaying a map inclusive of the coordinates searched by the search means and displaying on the map the area set by the area setting means as being distinguishable from other areas.

In another exemplary embodiment of a navigation system, the navigation system comprises coordinate setting means for setting specific coordinates based on the searched coordinates and control means for displaying a map with the set specific coordinates located at its center. The specific coordinates are coordinates in which values of the searched coordinates are changed or coordinates of a specific facility closest to the searched coordinates. A search means searches for an address from information on the subscriber stored in a memory means based on the telephone number input by an input means. The coordinate setting means sets coordinates of a representative point of a predetermined address level of the searched address as the specific coordinates. The predetermined area is an area of the map inclusive of the specific coordinates or area set based on the population density, regions, or the number of private homes or buildings in a given area. If information on the subscriber searched by the search means is on a classified specific subscriber, the control means displays a map inclusive of coordinates of the classified specific subscriber and displays on the map the area set by the area setting means as being distinguishable to other areas and if information on the subscriber is not on a classified specific subscriber, it further displays a map with coordinates of the subscriber located at its center.

In another exemplary embodiment of a navigation system for searching for coordinates based on an input of a telephone number, displaying a map based on coordinates and setting a point, the navigation system comprises a memory means for storing information on a subscriber inclusive of coordinates corresponding to a telephone number and map data, input means for inputting a telephone number, search means for searching for coordinates stored in the stored memory means based on the input of the telephone number from the input means, area setting means for setting a predetermined area inclusive of the coordinates searched by the search means, present position detecting means for detecting a present position, and control means for displaying a map inclusive of the coordinates searched by the search means and the predetermined area set by the area setting means, and for displaying on the map the present position detected by present position detecting means.

The control means displays on the map the predetermined area set by the area setting means as distinguishable from other areas, and if the present position detected by the present position detecting means is located out of the predetermined area, the control means moves the map in order to show the present position located at its center. Further, the control means displays on the map the predetermined area set by the area setting means as distinguishable from other areas, and if the present position detected by the present position detecting means is located within the predetermined area, the control means fixes the map with the predetermined area located at its center on a screen and displays a map thereon. The control means further divides a screen into a two-part screen and displays a map with the present position detected by the present position detecting means located at its center respectively on the respective parts of the screen.

BRIEF DESCRIPTION OF THE DRAWINGS

Various exemplary embodiments of the invention will be described in detail, with reference to the following figures, wherein

FIG. 3 is a diagram showing an example of a data structure to be used for a navigation system according to the invention;

FIG. 9 is a flowchart describing an example of box setting processing; and

DETAILED DESCRIPTION OF PREFERRED EMBODIMENTS

Figure 1:
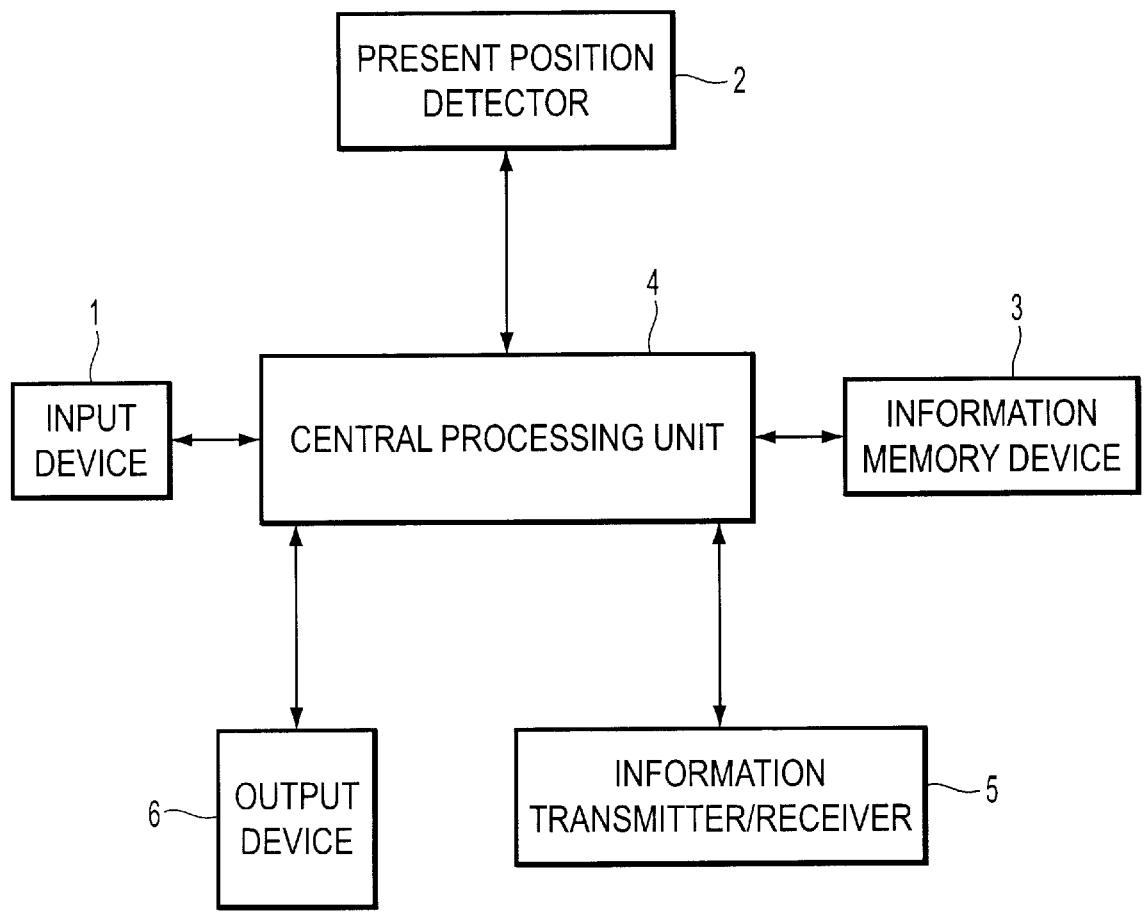
FIG. 1 is a diagram showing an exemplary embodiment of a navigation system according to the invention.

FIG. 1 is a diagram showing a first exemplary embodiment of a navigation system according to the invention. The navigation system includes an input device 1 for inputting information on route guidance; a present position detector 2 for detecting information on a vehicle present position; an information memory device 3 for storing therein data for a navigation apparatus necessary for calculating a route or display/audio guidance data as necessary for route guidance, programs (application and/or OS) and the like; a central processing unit 4 for performing route search processing as a navigator processor, display/voice guidance processing as required for route guidance and to control the entire system; an information transmitter/receiver 5 for transmitting and receiving information on the vehicle when traveling (for example, road information or traffic information), and for detecting information on the vehicle present position and further transmitting and receiving information on the vehicle present position; and an output device 6 for outputting information on route guidance.

The input device 1 is provided with functions for inputting a destination and instructing the central processing unit 4 to execute the navigation processing in conformity with a driver's intention. In order to attain the functions, a remote controller and the like (for example, a touch switch, a jog dial or the like) for inputting a destination in the form of a telephone number or coordinates on a map, etc., and for requesting route guidance can be used. Further, the invention is provided with a voice input device for performing an interaction by voice input. A record card reader can also be used for reading data recorded in an IC card or a magnetic card. Furthermore, a data communication device may be used for data communications between information sources, such as an information center, for accumulating therein data necessary for navigation and providing information via communication links upon the driver's request, and a portable style electronic device, etc. having map data, destination data, data of a simple frame map and a building shape map and the like.

The present position detector 2 is composed of a device for receiving information on the vehicle present position by using the Global Positioning System (GPS), an absolute direction sensor for detecting the travel direction of the vehicle with an absolute direction by using, for example, a geomagnetic sensor, a relative direction sensor for detecting the travel direction of the vehicle by using, for example, a steering sensor and a gyro sensor, a distance sensor for detecting the travel distance, for example, from a number of revolutions of a wheel, and the like.

The information memory device 3 is an external storage device in which programs and data for navigation are stored. The information memory driver may comprise a CD-ROM or other high density storage media. The stored programs therein include a program for performing processing, such as a route search, etc., a processing program, such as shown in FIGS. 5–8, a program for performing the display output control necessary for route guidance and performing guidance in the interactive manner by the voice input and the necessary data therefor, and a program for performing the voice output control necessary for the voice guidance and the necessary data therefor. The data to be stored therein are composed of files, such as map data, search data, guidance data, map matching data, destination data, register point data, road data, image data of junction points, such as intersections, etc., genre data, landmark data and the like, in which all the data necessary for a navigation apparatus is stored. In addition, the invention can be applied to a kind of system in which the CD-ROM only stores the data and the central processing unit 4 stores the programs. Here, the CD-ROM is exemplified as the information memory device, however, it may be replaced by an optical disc, such as a DVD-ROM, etc., a magnetic disc, such as a floppy disc, etc., or a magneto-optic disc, etc., such as a MO, etc.

The central processing unit 4 comprises a CPU for performing various calculation processing, a flash memory for reading and storing the programs from the CD-ROM of the information memory device 3, a ROM for storing a program (or program reading means) for checking and updating the programs contained in the flash memory, and a RAM for temporarily storing the searched route guidance information, such as point coordinates of the determined destination, a road name code NO., and the like, or data from the calculation processing. The central processing unit 4 further includes a voice processor for performing the communication processing by the voice input from the input system 1. The central processing unit 4 further provides for synthesizing a voice, phrase, a sentence, sounds and the like read out of the information memory device 3 based on the voice output control signal received from the CPU, into an analog signal, and outputting to a speaker. The central processing unit 4 further provides for a communication interface for transferring the input/output data by communications, a sensor-input interface for receiving the sensor signal of the present position detector 2 and a clock for entering a data and time into internal diagnosis information. In addition, the programs for performing the updating processing may be stored in an external memory device.

The programs according to the invention and the other programs for executing navigation may be wholly stored in a CD-ROM as an external memory medium, or they may be partially or wholly stored in the ROM. The data and programs, stored in the external memory medium, are input as external signals to the central processing unit 4 of the navigation apparatus and processed by a calculation so that various navigation functions are realized.

As described above, the navigation apparatus embeds therein the flash memory having a relatively large capacity for reading programs from the CD-ROM of the external memory device with the ROM having a small capacity that stores a program (or program reading means) for performing an initiation processing of the CD. The flash memory is non-volatile memory means for maintaining the stored information even if the power is turned off. In order to perform the initiation processing of the CD, the program stored in the ROM or the program reading device is initiated to check the programs stored in the flash memory and read the disc managing information, etc. stored in the CD-ROM of the information memory device 3. The loading processing (or updating processing) of the programs is performed by the judgment on this information and the state of the flash memory.

The information transmitter/receiver 5 comprises a GPS receiver for obtaining information by making use of the satellite navigation system (GPS), a VICS receiver for obtaining information by making use of FM multi-channels, electric beacons, light beacons, etc. A data transmitter/receiver is exemplified by a portable telephone, a personal computer, etc. for exchanging the information with an information center (e.g., ATIS) or other vehicles, and the like.

The output device 6 is provided with functions for outputting voice/display guidance information as required by the driver and for outputting the navigation data processed in the CPU 4 to the printer. In order to perform these functions, the output device 6 comprises a memory for drawing data processed in the CPU 4 or data stored in the information memory device 3 in order to display on a screen, a display for displaying image data drawn in the memory, a printer for outputting the data processed in the CPU 4 or the data stored in the information memory device 3 and printing out, a speaker for outputting route guidance by voice, and the like.

The display includes a color CRT or liquid-crystal display device, etc., and displays screens showing enlarged intersections, destination names, time, distances, travel direction arrows and the like based on the display data or guidance data of a map to be processed by the CPU 4. Image data to be transmitted to the display are binary image data (bitmap data), and display data or guidance data of the map processed by the CPU 4 are received through a communication line used for a serial communication, etc. or through the sharing of other communication lines. The data thus received is drawn in the memory within the output system 6, and is thus displayed on the screen.

The display is mounted in the instrument panel in the vicinity of the driver's seat so that the driver is able to confirm the present position of his vehicle and to obtain information on a next route to follow. Moreover, the display may be composed of points or roads, etc. can be input by touching or tracing of the screen making use of a tablet including a touch panel, a touch screen, etc. on the display screen.

Figure 2:
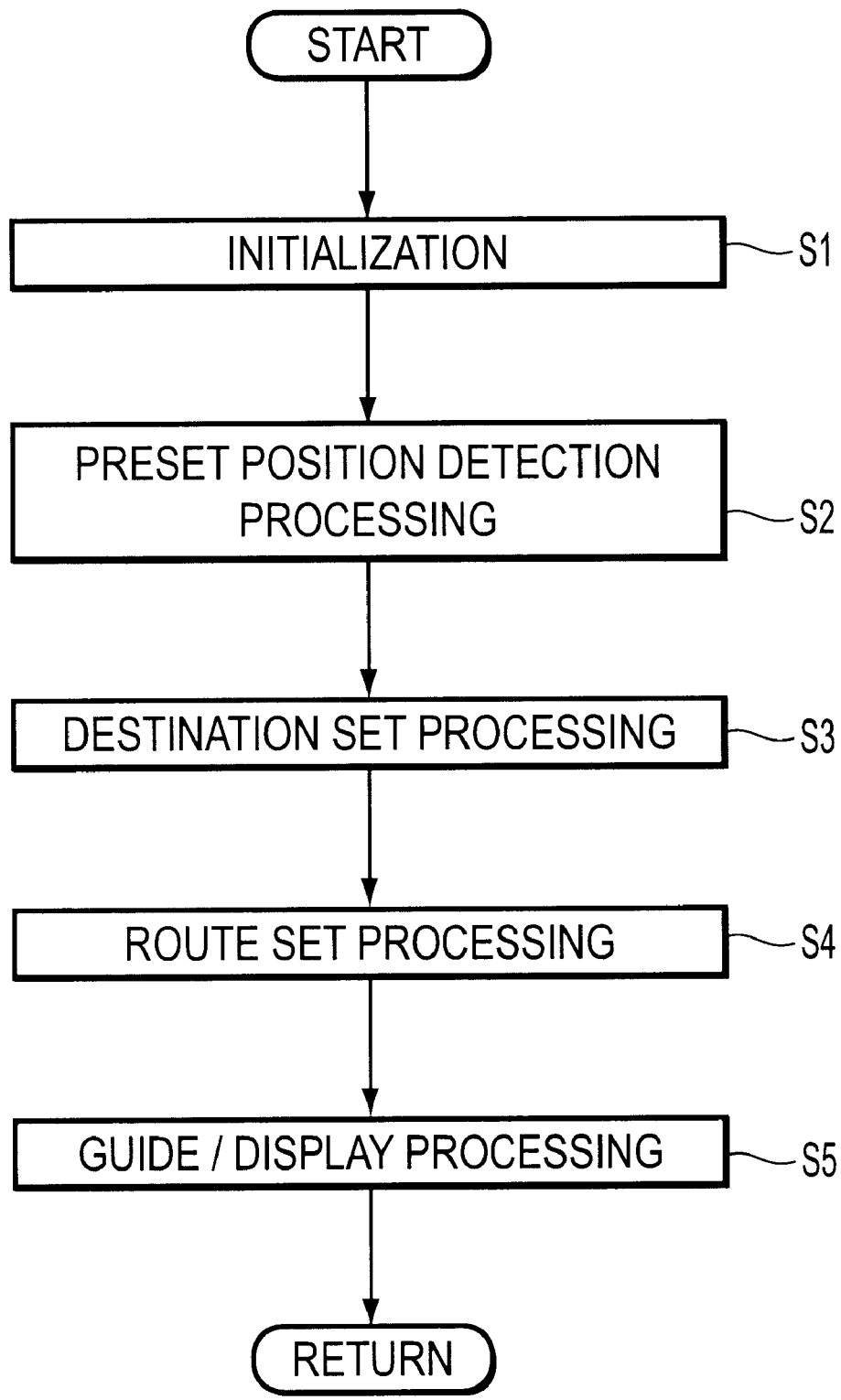
FIG. 2 is an overview flowchart describing the navigation system according to the invention.

FIG. 2 is an overview flowchart describing the navigation system according to the invention. A program for route guidance is started S1 as the program is read from the information memory device 3 into the central processing unit 4. A present position S2 is then searched by the present position detector 2 and the name of the present position and the like is displayed simultaneously while displaying a vicinity map with the present position being placed at its center. Next, a destination is set S3 by use of a name of the destination, such as area name, facility name, etc., telephone number, address, registered point, road name or the like. A route from the present position to the destination is then searched S4. As the route is determined, route guidance/display S5 is repeated until the vehicle reaches the destination while the present position is traced by the present position detector 2. When a stop setting is input before reaching the destination, a search area is set and re-search is preformed in that search area and, in the same way, route guidance is repeated until the vehicle reaches the destination.

According to the invention, in a case where a pinpoint display is preferably avoided, such as a private home, coordinates are obtained by searching for a corresponding private home based on an input of a telephone number. After the specific coordinates are set based on the coordinates, a map with the specific coordinates (nearby point) located at its center is displayed. The user is then allowed to find his/her desired private home with the home designated as a destination or a passing point, for example, in order to perform point setting. The specific coordinates are, for example, coordinates of a vague point calculated based on coordinates obtained by searching for a private home, with the last three digits of the coordinates of a point corresponding to a telephone number omitted or a latitude of "127.125" rounded off to "127.00" or the values of coordinates of an intersection located at the shortest distance from the home, coordinates of a specific facility or coordinates of a representative point (an origin or a center point of the mesh) of the predetermined address level (for example, Koaza) or the like substituted.

When setting a point, such as a starting point, a destination, a via point, a register point of user's memory or the like, if it is desired to avoid a pinpoint, such as a private home, a corresponding private home is searched based on an input of a telephone number and coordinates thereof are obtained, for example. A map with a vague pinpoint located at its center is displayed based on the coordinates and a box inclusive of coordinates of the pinpoint of the private home is displayed on the map. Thus, the user can find his/her desired private home within the limited box and a point setting is performed. The vague point is, for example, a representative point of the predetermined address level (for example, Koaza), coordinates of a point corresponding to a telephone number of which the last three digits of the coordinate values are omitted, namely, being changed to "000", an intersection at the shortest distance or the like.

Further, the invention displays a box inclusive of coordinates of the vague point in addition to the coordinates of the pinpoint of the private home so as to facilitate setting of a point, such as a destination, a via point or the like.

Figure 4:
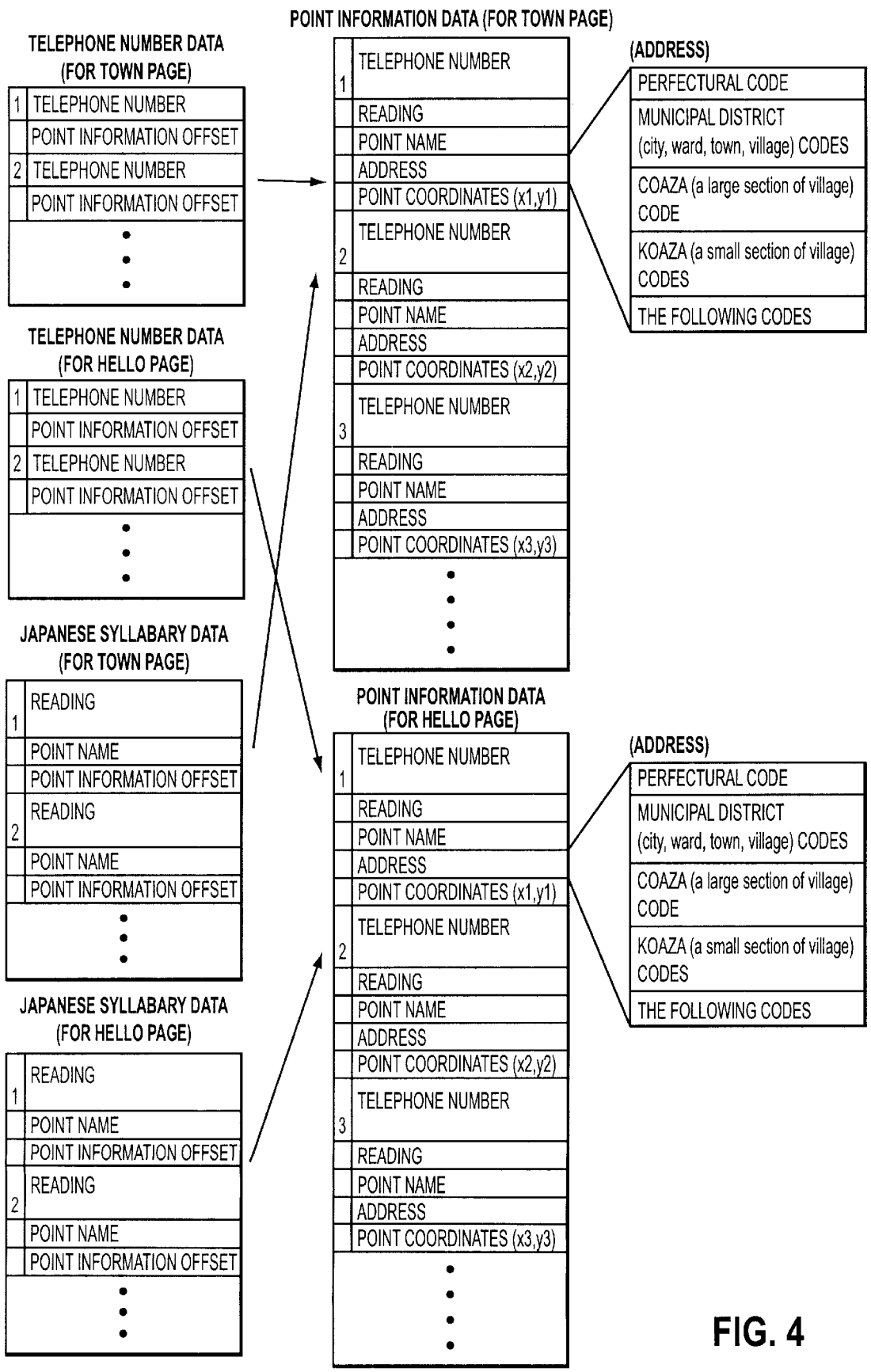
FIG. 4 is a diagram showing an example of data structure in which data are divided into data for town page and for hello page.

FIG. 3 is a diagram showing an example of data structure (for Japan, other countries would have a similar data structure) to be used for a navigation system according to the invention, and FIG. 4 is a diagram showing an example of data structure divided into data for the town page and for the hello page.

Data to be used for a navigation system according to the invention can include telephone number data, Japanese syllabary data or other data as appropriate, and point information data as shown in FIG. 3. Further, the telephone number data is data in which telephone numbers and point information data offset are stored in ascending or descending numeric order. The point retrieval output system retrieves the data when a telephone number is input and point information data is obtained based on point information data offset from that telephone number. The point information data offset can show, for example, a stored address of point information data. The telephone number data and point information data are normally search data. Thus, when a telephone number is input, point information data offset of the hit (matching) telephone number is searched and various information on the point (a point name, an address or etc.) is searched from the point information data based on the corresponding point information data offset with the searched information displayed on a map. The Japanese syllabary data (for Japan, other countries would have similar descriptive data) is data in which readings or point names of the subscribers of the telephone numbers and point information data offset are stored in order of Japanese syllabary, wherein the navigation system searches when a reading or a point name is input and point information data is obtained based on the point information data offset of that reading or point name. Here, the point name is a facility name, a personal name or the like.

Point information data are stored in order of telephone number or Japanese syllabary, or based on the respective address groups, each of which include information on a point of a telephone subscriber, such a point name, an address, an address identification flag, point coordinates (x, y) etc., and an identification flag. As shown in FIG. 3, with the addresses being different in other countries, Prefectural code, Municipal district code (city, town and village), Ooaza code (a large section of village), Koaza code (a small section of village) and the following codes are given, for example, "Aichi-Prefecture" is 23 and "Okazaki-City" is 202 based on each hierarchy of the address. The address identification flag shows the hierarchy of address levels used. Further, point coordinates are used, for example, for displaying a map with that point located at its center or displaying that point by putting a mark on the map or searching and obtaining a vague point nearby.

The identification flag is provided to classify subscribers, for example, which classifies whether a subscriber of a telephone number is a subscriber giving restriction, namely, a private subscriber, or a subscriber given no restriction, namely, an entrepreneur. Therefore, if according to telephone directories, data of the town page telephone directory (town page is a registered trademark of NTT) are data of entrepreneurs of facilities, shops, firms and the like so that they are given no restriction, and data of the hello page telephone directory (hello page is a registered trademark of NTT) are data of private homes so that they are given restriction, on which identification flags are set. As should be appreciated, the identifying information of restriction or no restriction may be set based on other classifications or divisions. If the telephone number is given no restriction, as mentioned above, point information is immediately provided, and if the telephone number is given a restriction, the name of the subscriber is checked and point information is provided according to the hit. Further, when an address is displayed on a screen with letters, it may be structured that the letters are converted from codes by use of a separately stored address database.

FIG. 4 is a set of block diagrams showing an example of the data structure by dividing respectively the above telephone number data, Japanese syllabary data and map information data into data for the town page given no restriction setting and data for the hello page given a restriction setting. In this case, identifying information for classifying whether the data is for the town page or whether data is for the hello page are set as the point information data is not required. Therefore, when such a data structure is used, selecting an input mode, whether a telephone number in the town page or the hello page, namely, whether it is for inputting a telephone number giving no restriction or restriction and it can be structured that a search is performed by determining a telephone number offset based on that selection.

Figure 5:
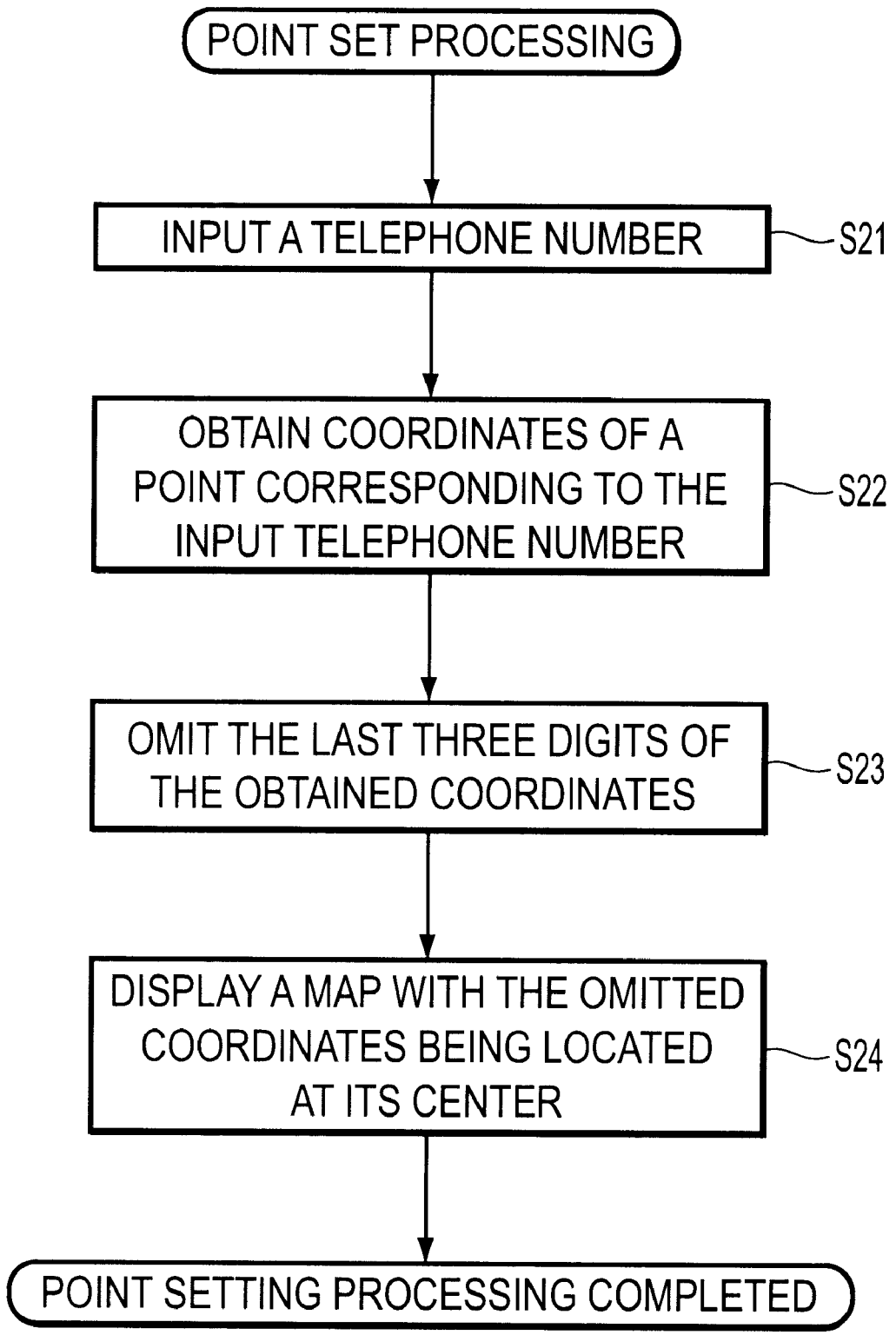
FIG. 5 is a flowchart showing an example of point setting processing for displaying a map with omitted coordinates located at its center.
Figure 6:
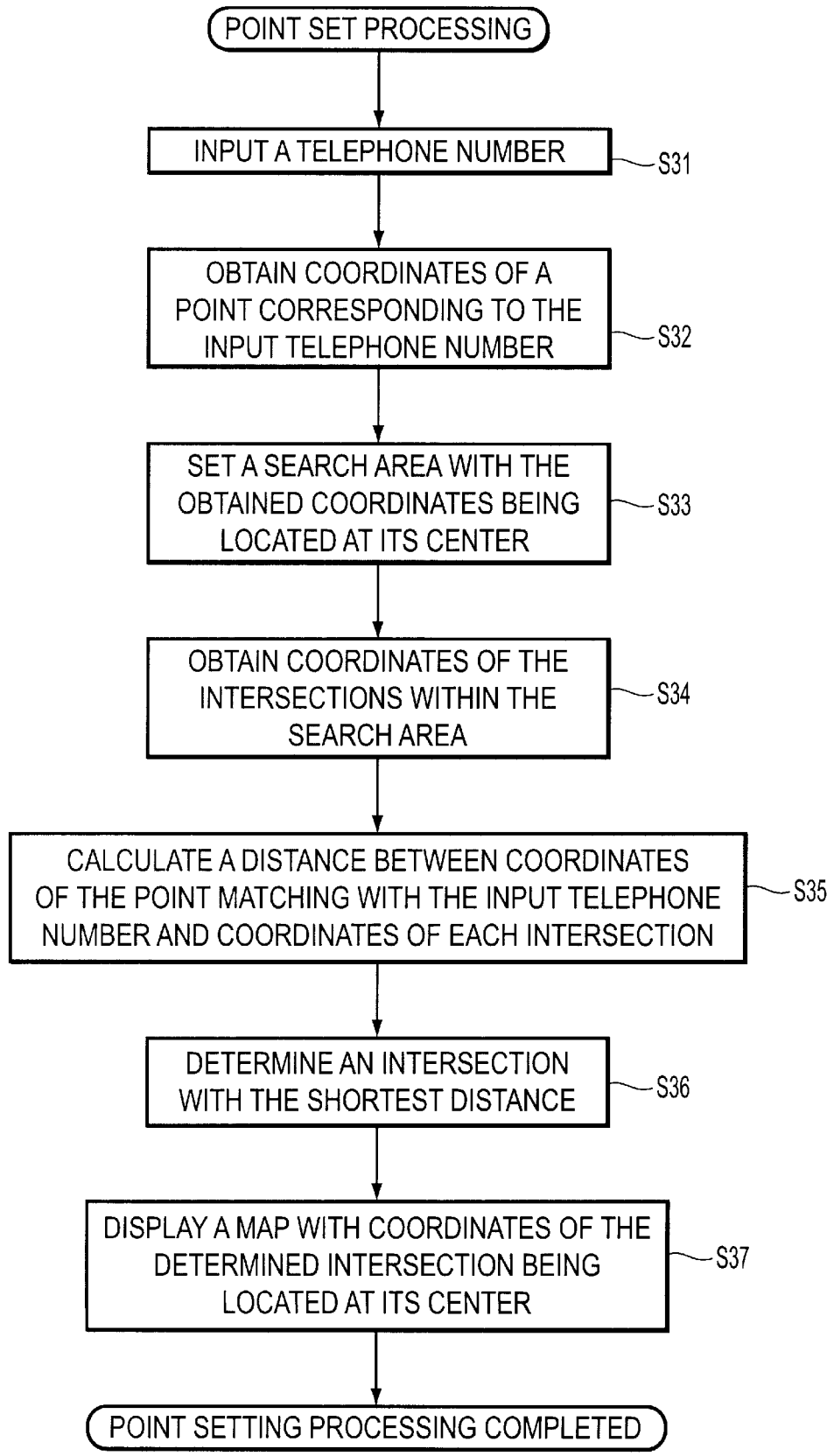
FIG. 6 is a flowchart showing an example of point setting processing for displaying a map with a nearby intersection located at its center.

Next, an example of point setting processing by a concrete map display will be described. FIG. 5 is a flowchart describing a point setting processing for displaying a map with omitted coordinates located at its center and FIG. 6 is a flowchart describing a point setting processing for displaying a map with a nearby intersection located at its center.

In a point setting processing, for example, when the coordinates are set with the last digit omitted so as to be specific coordinates based on the coordinates searched and obtained by a telephone number, a map with the coordinates located at the center of the map is displayed and a point such as a destination or a passing point etc. is set based on the displayed map. As shown in FIG. 5, a telephone number is input by a telephone input mode S21, and coordinates of a point corresponding to the input telephone number are obtained from the point information data S22. Next, the last three digits of the obtained coordinates are omitted S23, and a map with the coordinates having the last three digits omitted located at its center is displayed S24.

Further, coordinates of a nearby intersection can be set as specific coordinates with the coordinates located at the center of a map displayed. In an example of a point setting processing for setting a point, such as a destination or a passing point, etc., based on the displayed map, as shown in FIG. 6, a telephone number is input by a telephone number input mode S31 and coordinates of a point corresponding to the input telephone number are obtained from point information data S32. Next, a search area with the obtained coordinates located at its center is set S33, coordinates of intersections located within the search area are obtained S34, distances between coordinates of a point corresponding to the input telephone number and respective coordinates are calculated S35, and an intersection located at the shortest distance from the coordinates of a point corresponding to the input telephone number is determined S36. Then, a map with the coordinates of the determined intersection located at its center is displayed S37. Then, as coordinates are omitted by the user or the intersection located at the shortest distance is set as a passing point or a destination, a route from the present position to the destination etc. is searched, guidance is performed based on the route, and a display is performed. When reaching the coordinates having the last three digits omitted or the intersection, the user can refer to the map or the telephone of the private home for checking the precise location of the private home etc., so that he/she will be able to arrive at the desired private home.

The invention is not limited to the above exemplary embodiments and various modifications may be made. For example, in the above exemplary embodiments, the last three digits of the coordinates obtained by searching for a private home are omitted, however, the number of digits can be optionally selected. This optional number of digits can be selected according to a population density or home density. For example, if the population density or home density is high, the one digit is omitted. On the other hand, if the population density or home density is low, the last three digits are omitted. Further, any number can be rounded to the nearest whole number, or the last digit may be exchanged with the second last digit or other digits other than the aforementioned digits may also be exchanged with each other. Further, the last three digits may be randomly changed by use of a random value generating system (not shown), or predetermined values corresponding to the X and Y coordinates may be added or subtracted. Thus, as should be appreciated, anything that changes the values of the coordinates of a point corresponding to the input telephone number can be used. Although an intersection located at the shortest distance is searched from the obtained coordinates, it should be appreciated that a specific facility can be used, such as a police station, a parking garage, etc. Furthermore, as should be appreciated, the coordinates may be absolute coordinates or relative coordinates.

Figure 7:
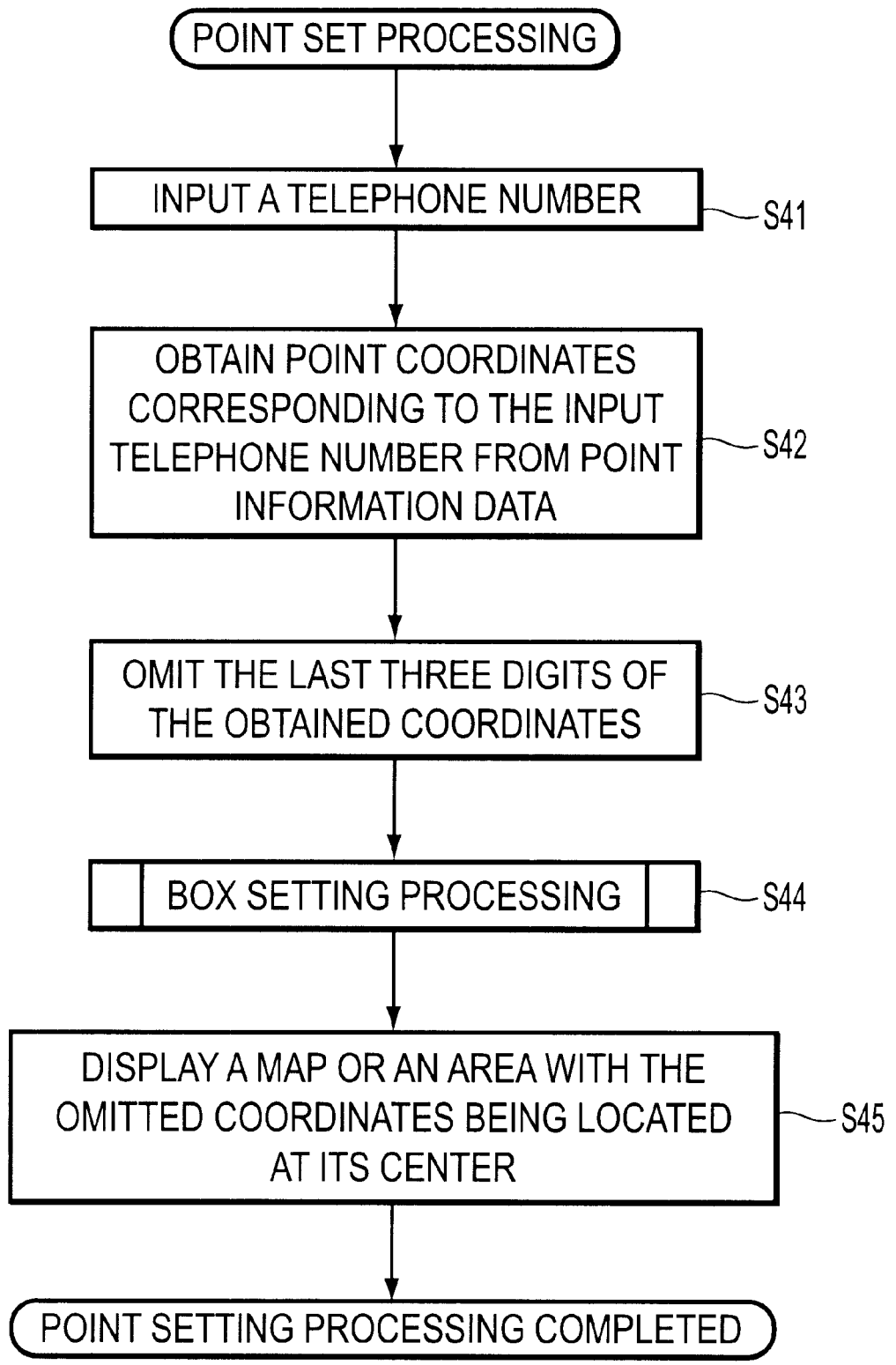
FIG. 7 is a flowchart describing an example of point setting processing for displaying a map with omitted coordinates located at its center.
Figure 8:
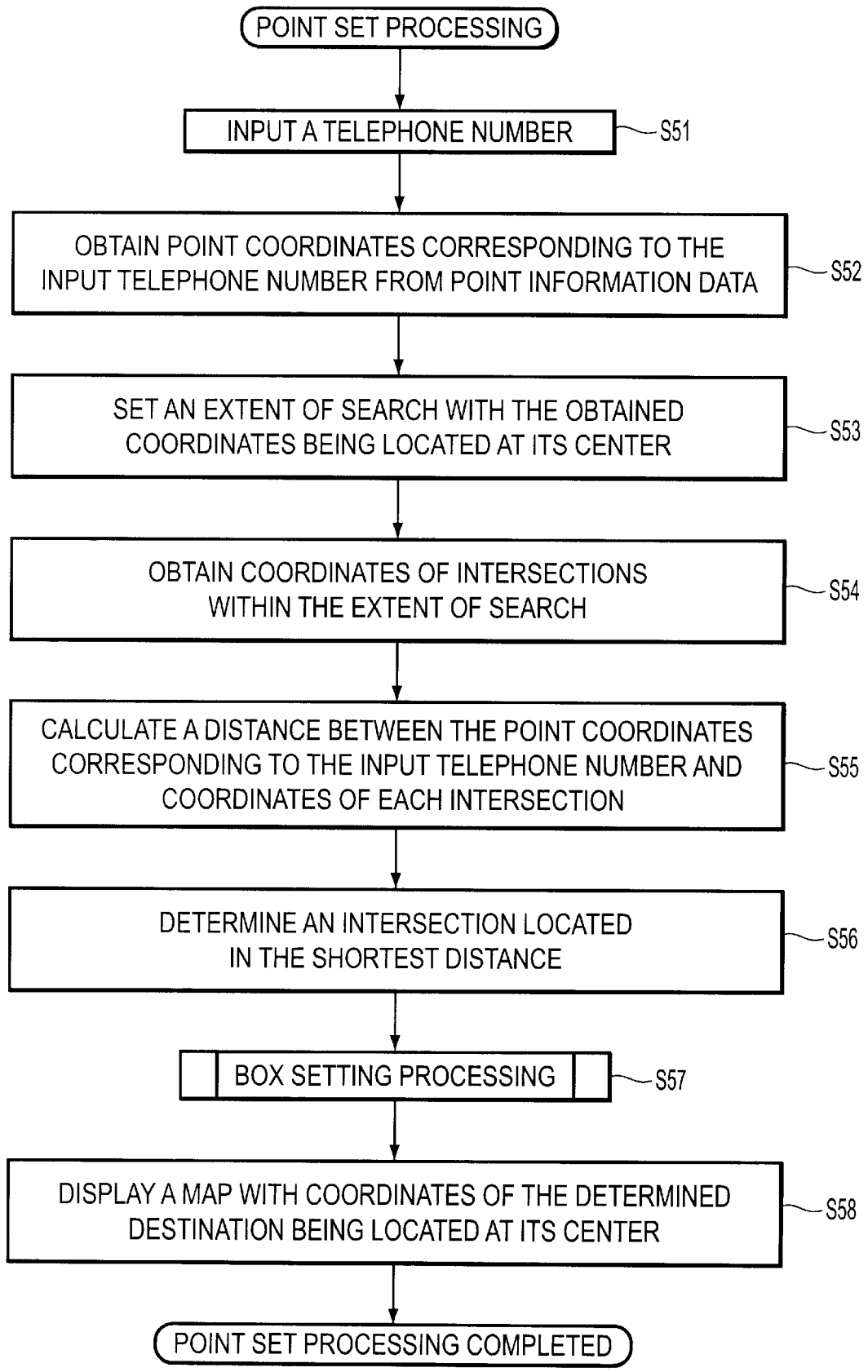
FIG. 8 is a flowchart describing an example of point setting processing for displaying a map with a nearby intersection located at its center.

Next, an example of a point setting processing by a map display will be shown. FIG. 7 is a flowchart describing point setting processing for displaying a map with coordinates having the last three digits (or some variant as described) omitted located at its center, and FIG. 8 is a flowchart describing point setting processing for displaying a map with a nearby intersection located at its center.

In an exemplary embodiment of a point setting processing, coordinates of which an optional number of digits are omitted is set as specific coordinates based on the specific coordinates searched by a telephone number, a map with the specific coordinates located at its center is displayed, and a point, such as a destination, a passing point or the like, is set based on the displayed map. As shown in FIG. 7, a telephone number is input by a telephone number input mode S41 and coordinates of a point corresponding to the input telephone number is obtained S42. Then, the last three digits of the obtained coordinates are omitted S43, box setting processing is performed S44, and a map with the coordinates having the last three digits omitted located at its center is displayed together with a box displayed on the map S45.

Further, when the point setting processing sets the coordinates of a nearby intersection as the specific coordinates, a map with the coordinates located at its center is displayed and a point, such as a destination, a passing point or the like, is set based on the displayed map. As shown in FIG. 8, a telephone number is input by a telephone number input mode S51 and coordinates of a point corresponding to the input telephone number is obtained from point information data S52. Next, a search with the obtained coordinates located at its center is set S53, coordinates of intersections located within the extent of the search are obtained S54, a distance between coordinates of the point corresponding to the input telephone number and coordinates of each intersection is obtained S55 and an intersection located in the shortest distance is determined S56. Then, box setting processing is performed S57 and a map with the coordinates of the determined intersection located at its center is displayed together with a box displayed on the map S58.

Thus, as should be appreciated, the user can find his/her desired private home within the limited box by displaying a map inclusive of coordinates of a pinpoint of the private home. However, in order to facilitate the setting of a destination, an example of a passing point or the like, in which a box inclusive of the coordinates of a vague pinpoint in addition to the coordinates of the pinpoint of the private home set will be described. FIG. 9 is a flowchart describing box setting processing and FIGS. 10A–C are diagrams showing examples of a screen when a box display and a present position display are performed together.

As shown in FIG. 9, as the box setting processing is performed, a distance between coordinates of the point obtained at step S42 or S52 and coordinates of which the last three digits are omitted or vague coordinates, such as coordinates of the shortest intersection, etc., is measured S61. A box inclusive of those two points is then displayed based on the measured distance S62. Then, for example, a number of private homes located within the temporarily set box are searched S63, the size of the box is gradually enlarged until a predetermined number of private homes is searched S64 and S65 and the size of the box is determined S66. The temporarily set box is embodied in various forms, such as a rectangular point with a vague point located at its center, a rectangular box with a center point between the vague point and a point of the corresponding private home located at it center, and a rectangular box of which the opposite parallel sides are also parallel to a line connecting the vague point with the corresponding private home.

When the number of private homes are searched in the above exemplary embodiment, the size of the box may be determined based on the region, such as a city, an over populated area or a under populated area, or how much the area is crowded with buildings. Further, when a box is temporarily set, if the number of private homes is over a predetermined number, the size of the box may be reduced to a box inclusive of two point coordinates of the pinpoint of the private home and the vague point. Therefore, an adequate number of private homes is searched.

Figure 10A:
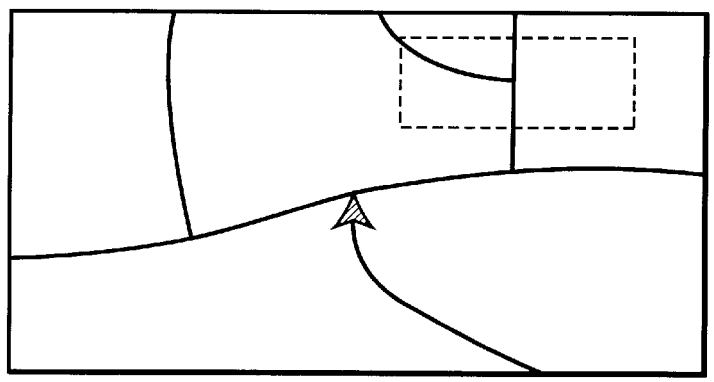
FIGS. 10(A)–(C) are diagrams showing examples of screen when a box display and a present position display are performed together.
Figure 10B:
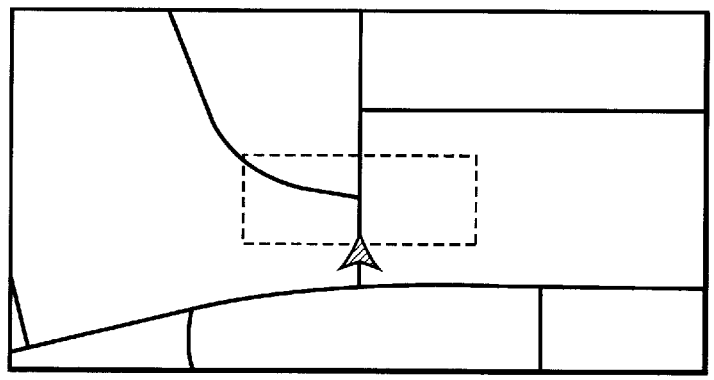
Figure 10C:
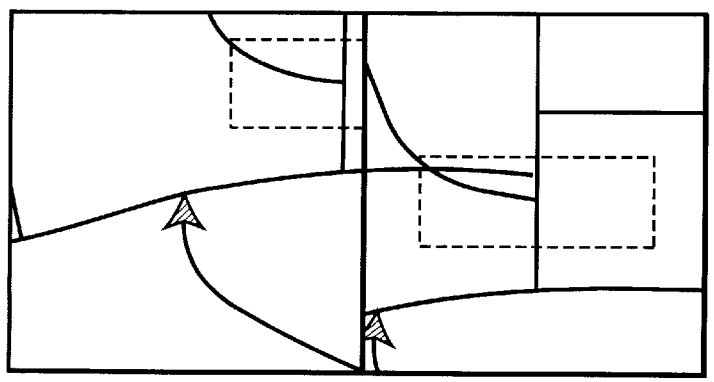

When a box and a present position are displayed together on a map according to the above processing, for example, a mark of a present position (a center arrow) and a box (a dotted line) are displayed together on a map with the present position located at its center as shown in FIG. 10A. An exemplary embodiment that marks the present position and the box displayed together on a map with the box located at its center is shown in FIG. 10B. Further an exemplary embodiment of the present position and box displayed together in each part of a two-part screen is shown in FIG. 10C. When the box and the present position are displayed together, and if a scale is fixed, the box is displayed out of screen in the display of FIG. 10A and the mark of the present position is out of screen in the display of FIG. 10B. Therefore, the scale may be changed according to a distance between the box and the present position in order to display the both of them together. Further, if the present position is located out of the box, for example, the map is moved in order to locate the present position at the center of the map as shown in FIG. 10A. However, if the present position comes into the box, the map is fixed in order to locate the box at the center of the map as shown in FIG. 10B. Further the scale may be changed so that the box is approximately the same size as the screen. Further, a selection of a two-part screen display, as shown in FIG. 10C, or one screen display, as shown in FIGS. 10A or 10B may be changed based on a selected instruction by the user.

As should be appreciated, the invention is not limited in the above exemplary embodiments and various changes can be realized. For example, in the above exemplary embodiments, a predetermined area, such as an extent inclusive of a representative point of an address level, is used with the coordinates in which the last three digits of the coordinates corresponding to an input telephone number are omitted with an intersection, a plurality of private houses or the like is then set, and an extent inclusive of coordinates of a pinpoint of a private home of a telephone number is displayed in a box with the dimensions of a rectangle, however, various shapes such as a polygon, circle, oval, square or the like may be used.

Further, as long as the exemplary embodiments of the displayed set area is distinguishable from other areas, the displayed set area may be, for example, in a color different from a color of the other areas on the map, the other area on the map may be erased or the like, or the area may not be displayed with a box.

Further, the last three digits are omitted for coordinates obtained by searching a private home, however, a number of the digits can be optionally selected. The number of digits can be selected according to the population density or how much the area is crowded with houses. For example, if the area is densely populated or crowded with houses, the last one digit is omitted. On the other hand, if the area is not densely populated or crowded with houses, the last three digits are omitted.

Further, instead of omitting, the digit(s) may be rounded to the nearest whole number, or the last digit and the second digit from the last may be exchanged with each other, or respective numbers of other digits may be exchanged with each other.

Further, the last three digits may be randomly changed by use of a random value generating system (not shown), or respective predetermined values corresponding to the X and Y coordinates may be added or subtracted. Thus, as should be appreciated, anything that changes the values of coordinates of a point corresponding to the input telephone number can be used. Although an intersection located in the shortest distance is searched from the obtained coordinates has been described, it should be appreciated that a specific facility can be used, such as a police station, a parking garage, etc., can be used. Furthermore, the coordinates may be absolute coordinates or relative coordinates.

As should be appreciated, the invention is a navigation system for searching coordinates based on an input telephone number, displaying a map and setting a point, the navigation system comprising a memory for storing information on a subscriber inclusive of coordinates corresponding to a telephone number, an input device for inputting a telephone number, a search device for searching a subscriber and coordinates based on the input of the telephone number, a coordinates setting device for setting specific coordinates based on the searched coordinates, and a control device for displaying a map with specific coordinates set by the coordinates setting device on the condition that a subscriber searched by the search device is a specific classified subscriber, wherein when a specific classified private home corresponding to the input of a telephone number is used, a map is displayed with a vague point located at its center, thereby, preventing the private home from being displayed directly thereon.

Further, specific coordinates are coordinates in which optional digit numbers of the searched coordinates are changed to zero or rounded to the nearest whole number. Furthermore, coordinates to which the searched coordinates values are changed, coordinates of an intersection closest to the searched coordinates or coordinates of a specific facility closest to the searched coordinates can be used, therefore, the user knowing a point of the private home is able to easily find the private home of the input telephone number. Still further, the need to have specific coordinates corresponding to each telephone number is not required so that a vague point can be displayed without increasing the memory capacity of the data.

In another exemplary embodiment of a navigation system for searching coordinates based on an input of a telephone number, displaying a map based on the coordinates and setting a point, the navigation system comprises a memory for storing information on a subscriber inclusive of coordinates corresponding to a telephone number and map data, an input device for inputting a telephone number, a search device for searching for coordinates stored in the stored memory device based on the input of the telephone number from the input device, an area setting device for setting a predetermined area inclusive of the coordinates searched by the search device, and a control device for displaying a map inclusive of the coordinates searched by the search device and displaying on the map the area set by the area setting device as distinguishable from other areas, wherein if a map with the searched coordinates located at its center is not displayed, a desired point, for example, a private home can be found within the limited box on the displayed map.

Further, another exemplary embodiment of the navigation system comprises a coordinate setting device for setting specific coordinates based on the searched coordinates, wherein a control device displays a map with the set specific coordinates located at its center. The specific coordinates are coordinates in which values of the searched coordinate are changed or coordinates of a specific facility closest to the searched coordinates are selected. The navigation system also includes a search device for searching an address from information on the subscriber stored in the memory based on the telephone number input by the input device, the coordinate setting device setting the coordinates of a representative point of a predetermined address level of the searched address as the specific coordinates. The predetermined area is an extent inclusive of the specific coordinates or an extent set based on the population density, regions, or how much the area is crowded with private houses or buildings. If information on the subscriber searched by the search device is for a classified specific subscriber, the control device displays a map inclusive of the coordinates of the classified specific subscriber and displays on the map the area set by the area setting device as being distinguishable from other areas and if information on the subscriber is not on a classified specific subscriber, the control device further displays a map with coordinates of the subscriber located at the center of the map so that a desired private home is not out of the center of the map and a box can be set easily as a destination or a passing point. Further, an adequate area for finding a private home can be set by a box.

Further, in various exemplary embodiments of a vehicle navigation system for searching coordinates based on an input of a telephone number, displaying a map based on the coordinates and performing a point setting, the navigation system comprises a memory for storing information on a subscriber corresponding to a telephone number and map data, an input device for inputting a telephone number, a search device for searching coordinates stored in the stored memory device based on the input of the telephone number from the input device, an area setting device for setting a predetermined area inclusive of the coordinates searched by the search device, a present position detecting device for detecting a present position, and a control device displaying a map with the coordinates searched by the search device and the predetermined area set by an area setting device and displaying on the map the present position detected by the present position detecting device, therefore, a relationship of positions between the present position and the private home can be easily seen and displayed while tracing the present position.

The control device displays on the map the predetermined area set by the area setting device distinguishable from the other area and if the present position detected by the present position detecting device is located out of the predetermined area, the control device moves the map as showing the present position located at its center, and further, the control device further displays on the map the predetermined area set by the area setting device as distinguishable from other areas, and if the present position detected by the present position detecting device is located in the predetermined area, the control device further fixes the map with the predetermined area located at the center of the map on a screen and displays the center thereon. Further, the control device divides a screen into a two-part screen and displays a map with the present position detected by the present position detecting device and a map with the predetermined area set by the area setting device located at the center of the map respectively on the respective parts of the screen. Therefore, a map can be displayed based on a distance from the present position approaching a vague point while tracing the present position.

What is claimed is:

1. A navigation system for searching coordinates based on a telephone number, displaying a map and setting a point, comprising:
    memory means for storing information on a subscriber inclusive of coordinates corresponding to a telephone number and map data;
    input means for inputting a telephone number;
    search means for searching for a subscriber and coordinates based on the input of the telephone number in the memory means that stores coordinates corresponding to the telephone number;
    coordinates setting means for setting specific coordinates based on the searched coordinates; and
    control means for displaying a map with specific coordinates set by the coordinates setting means located at its center on a condition that a subscriber searched by the search means is a specific classified subscriber.

2. A navigation system for searching coordinates based on a telephone number, displaying a map and setting a point, comprising:
    memory means for storing coordinates corresponding to a telephone number and map data;
    input means for inputting a telephone number;
    search means for searching for coordinates based on the input of the telephone number in the memory means that stores coordinates corresponding to the telephone number;
    coordinates setting means for setting specific coordinates based on the searched coordinates; and
    control means for displaying a map with specific coordinates set by the coordinates setting means located at its center.

3. The navigation system of claim 1, wherein the specific coordinates are coordinates in which the values of the searched coordinates are changed.

4. The navigation system of claim 3, wherein the specific coordinates are coordinates where an optional number of coordinate numerals are replaced with zero irrespective of digits, or the specific coordinates are coordinates rounded to the nearest integer irrespective of digits.

5. The navigation system of claim 1, wherein the specific coordinates are coordinates of a facility that is the closest to the searched coordinates.

6. The navigation system of claim 5, wherein the coordinates of the specific facility are coordinates of an intersection.

7. A navigation system for searching for coordinates based on a telephone number and displaying a map based on the coordinates and setting a point, comprising:
    memory means for storing information on a subscriber inclusive of coordinates corresponding to a telephone number and map data;
    input means for inputting a telephone number;
    search means for searching for coordinates stored in the stored memory means based on the input of the telephone number from the input means;
    area setting means for setting a predetermined area inclusive of the coordinates searched by the search means; and
    control means for displaying a map inclusive of the coordinates searched by the search means and displaying on the map the area set by the area setting means as being distinguishable from other areas.

8. The navigation system of claim 7, further comprising:
    coordinates setting means for setting specific coordinates based on the searched coordinates with the control means displaying a map with the set specific coordinates located at its center.

9. The navigation system of claim 8, wherein the specific coordinates are coordinates where values of the searched coordinates are changed.

10. The navigation system of claim 8, wherein the specific coordinates are coordinates of a specific facility closest to the searched coordinates.

11. The navigation system of claim 8, wherein the search means searches for an address from information on the subscriber stored in the memory means based on the telephone number input by the input means and the coordinate setting means sets coordinates of a representative point of a predetermined address level of the searched address as the specific coordinates.

12. The navigation system of claim 8, wherein the predetermined area is an extent inclusive of the specific coordinates.

13. The navigation system according to claim 7, wherein the predetermined area is an extent set based on the population density, regions, or how much the area is crowded with private homes or buildings.

14. The navigation system of claim 7, wherein if information on the subscriber searched by the search means is for a classified specific subscriber, the control means displays a map inclusive of coordinates of the classified specific subscriber and displays on the map the area set by the area setting means as distinguishable to other areas, and if information on the subscriber is not for a classified specific subscriber, the control means further displays a map with coordinates of the subscriber located at its center.

15. A navigation system for searching for coordinates based on a telephone number, displaying a map based on the coordinates and setting a point, comprising:
    memory means for storing information on a subscriber inclusive of coordinates corresponding to a telephone number and map data;

input means for inputting a telephone number;

search means for searching coordinates stored in the stored memory means based on the input of the telephone number from the input means;

area setting means for setting a predetermined area inclusive of the coordinates searched by the search means;

present position detecting means for detecting a present position; and control means for displaying a map inclusive of the coordinates searched by the search means and the predetermined area set by the area setting means, and displays on the map the present position detected by the present position detecting means.

16. The navigation system of claim 15, wherein the control means displays on the map the predetermined area set by the area setting means as distinguishable from other areas, and if the present position detected by the present position detecting means is located out of the predetermined area, the control means moves the map as showing the present position located at its center.

17. The navigation system of claim 15, wherein the control means displays on the map the predetermined area set by the area setting means as distinguishable from other areas, and if the present position detected by the present position detecting means is located within the predetermined area, the control means fixes the map as showing the predetermined area located at its center on a screen and displays it thereon.

18. The navigation system of claim 15, wherein the control means divides a screen into a two-parts screen and displays a map with the present position detected by the present position detecting means located at its center and a map with the predetermined area set by the area setting means located at its center respectively on the respective parts of the screen.

19. The navigation system of claim 2, wherein the specific coordinates are coordinates in which the values of the searched coordinates are changed.

20. The navigation system of claim 19, wherein the specific coordinates are coordinates where an optional number of coordinate numerals are replaced with zero irrespective of digits, or the specific coordinates are coordinates rounded to the nearest integer irrespective of digits.

21. The navigation system of claim 2, wherein the specific coordinates are coordinates of a facility that is the closest to the searched coordinates.

22. The navigation system of claim 2, wherein the coordinates of the specific facility are coordinates of an intersection.

* * * * *